US011297659B2

(12) United States Patent
Krishnamoorthy et al.

(10) Patent No.: US 11,297,659 B2
(45) Date of Patent: Apr. 5, 2022

(54) PAGING ADJUSTMENT IN A MULTIPLE SUBSCRIBER IDENTITY MODULE DEVICE

(71) Applicant: QUALCOMM Incorporated, San Diego, CA (US)

(72) Inventors: Parthasarathy Krishnamoorthy, San Diego, CA (US); Ozcan Ozturk, San Diego, CA (US); Muhammad Nazmul Islam, Littleton, MA (US); Kuo-Chun Lee, San Diego, CA (US); Chetan Chakravarthy, San Diego, CA (US); Krishna Rao Mandadapu, San Diego, CA (US); Vijay Marwah, Rancho Santa Fe, CA (US); Mueez Ahmad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/859,236

(22) Filed: Apr. 27, 2020

(65) Prior Publication Data
US 2021/0337590 A1 Oct. 28, 2021

(51) Int. Cl.
H04W 68/00 (2009.01)
H04W 74/08 (2009.01)
H04W 8/18 (2009.01)

(52) U.S. Cl.
CPC ........... H04W 74/085 (2013.01); H04W 8/18 (2013.01); H04W 68/00 (2013.01)

(58) Field of Classification Search
CPC ..... H04W 74/085; H04W 8/18; H04W 68/00; H04W 68/025; H04W 68/02; H04W 8/20; H04W 74/0833; H04W 74/08
See application file for complete search history.

(56) References Cited

U.S. PATENT DOCUMENTS

2014/0119343 A1* 5/2014 Chin ............... H04W 68/12 370/335
2015/0017982 A1 1/2015 Klatt
(Continued)

FOREIGN PATENT DOCUMENTS

WO 2018161244 A1 9/2018

OTHER PUBLICATIONS

International Search Report and Written Opinion—PCT/US2021/029013—ISA/EPO—dated Jul. 8, 2021.
(Continued)

Primary Examiner — Lakeram Jangbahadur
(74) Attorney, Agent, or Firm — Qualcomm Incorporated

(57) ABSTRACT

Methods, systems, and devices for wireless communication are described in relation to a Multiple Subscriber Identify Module (MSIM) user equipment (UE). The UE associated with multiple network subscriptions may determine a first timing of a first set of paging occasions associated with a first network subscription of the multiple network subscriptions, wherein the first network subscription is associated with a first network; determine a second timing of a second set of paging occasions associated with a second network subscription of the multiple network subscriptions, wherein the second network subscription is associated with a second network; compare the first timing and the second timing; detect a paging time adjustment condition based on the comparing; and based on the detecting, transmit to the first network, the second network or both a random access signal using a random access resource configured to convey a paging time adjustment request.

28 Claims, 8 Drawing Sheets

(56) References Cited

U.S. PATENT DOCUMENTS

| | | | |
|---|---|---|---|
| 2016/0286524 A1* | 9/2016 | Griot | H04L 41/00 |
| 2017/0280473 A1 | 9/2017 | Krishnamoorthy et al. | |
| 2017/0374645 A1* | 12/2017 | Tirronen | H04W 68/005 |
| 2020/0053830 A1* | 2/2020 | Venkataraman | H04W 68/02 |
| 2020/0329455 A1* | 10/2020 | Ryu | H04W 76/27 |
| 2021/0014822 A1 | 1/2021 | Gurumoorthy et al. | |

OTHER PUBLICATIONS

Qualcomm Incorporated, et al., "Avoidance of Paging Collisions to Minimize Outage of Services", 3GPP Draft, SA WG2 Meeting #122, S2-174243-PAGINGCOLLISION_V8, 3rd Generation Partnership Project (3GPP), Mobile Competence Centre, 650, Route Des Lucioles, F-06921 Sophia-Antipolis Cedex, France, vol. SA WG2, No. San Jose Del Cabo, Mexico, Jun. 26, 2017-Jun. 30, 2017, 8 Pages, Jun. 20, 2017 (Jun. 20, 2017), XP051309326, Retrieved from the Internet: URL: http://www.3gpp.org/ftp/tsg_sa/WG2_Arch/TSGS2_122_Cabo/Docs/ [retrieved on Jun. 20, 2017] chapters 1, 2.

\* cited by examiner

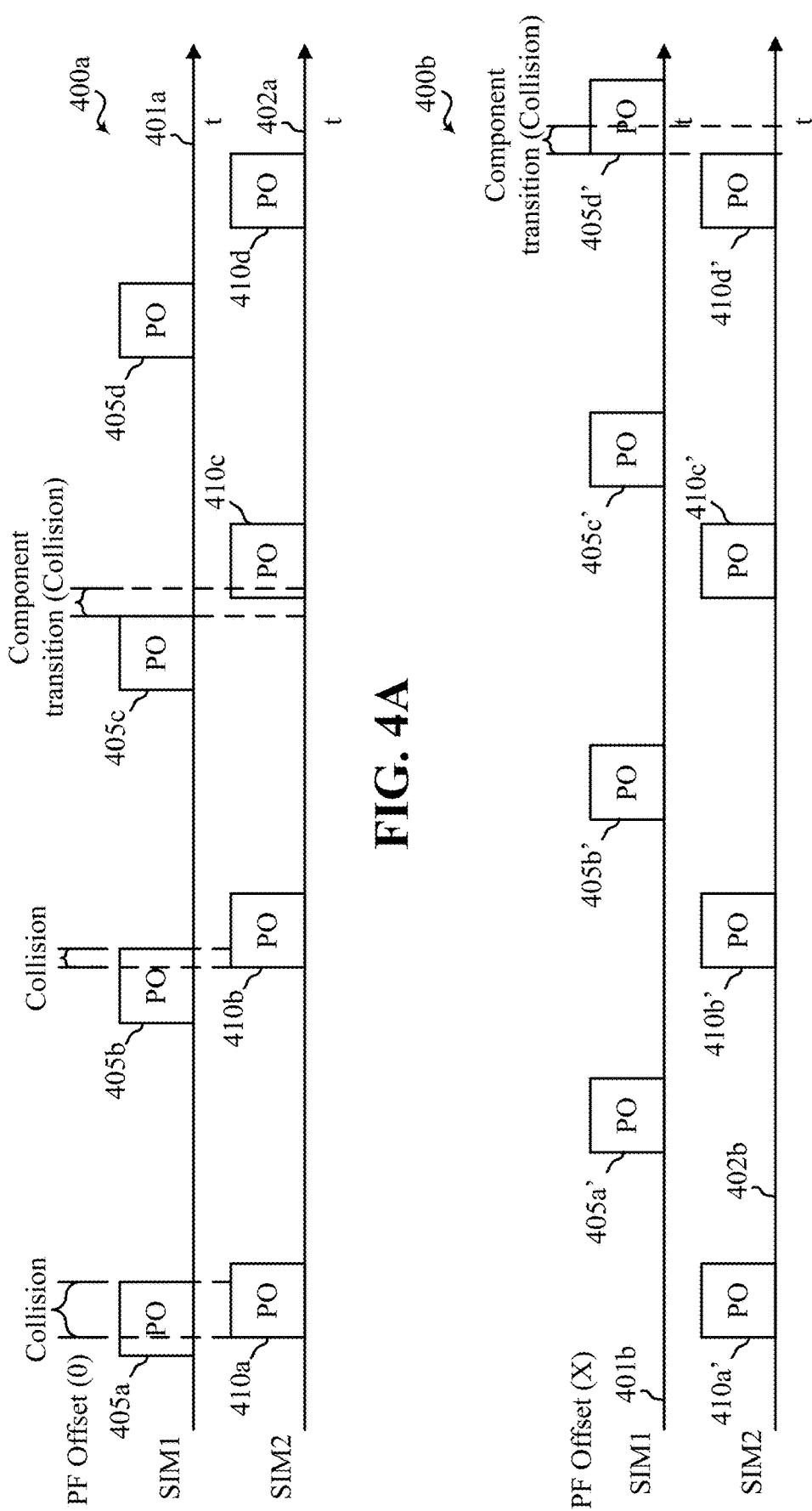

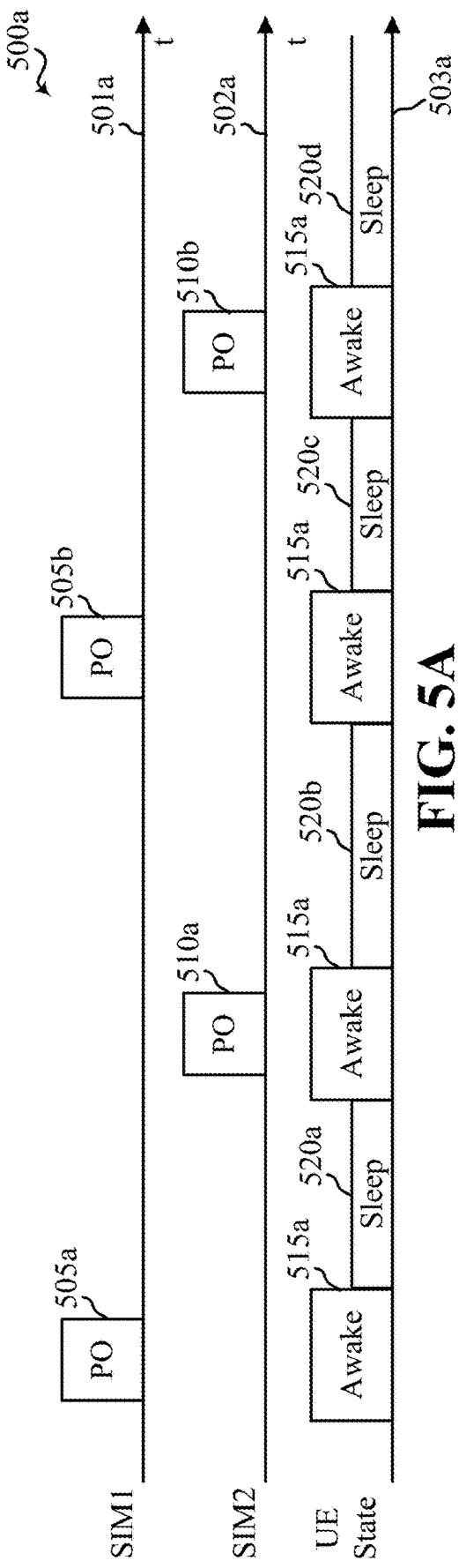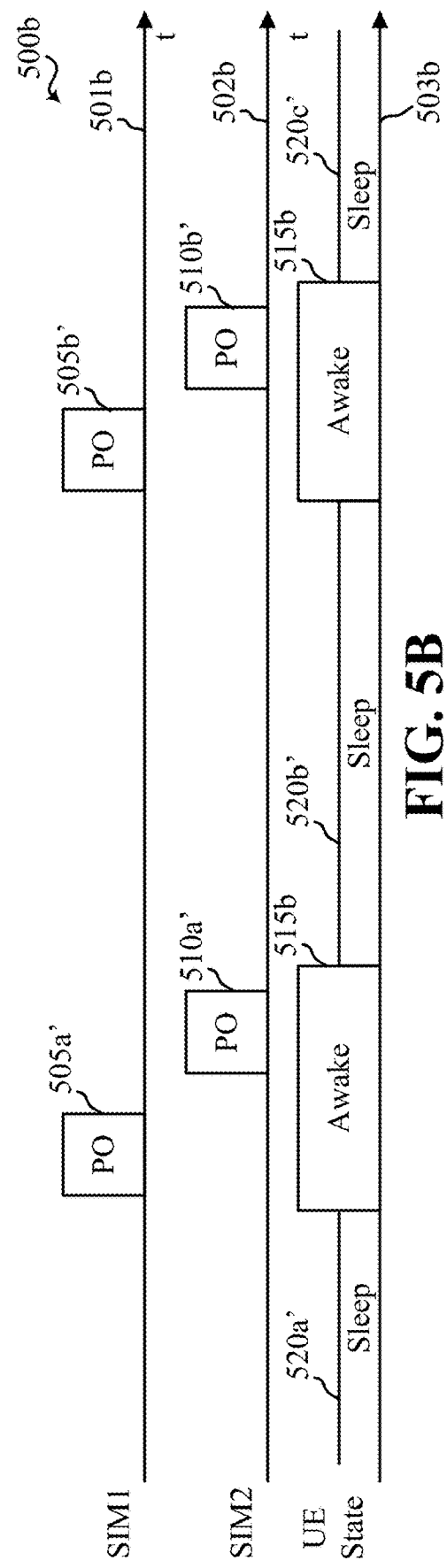
FIG. 5A
FIG. 5B

PAGING ADJUSTMENT IN A MULTIPLE SUBSCRIBER IDENTITY MODULE DEVICE

BACKGROUND

Technical Field

The present disclosure relates generally to communication systems, and more particularly, to Multiple Subscriber Identity Module (MSIM) devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple access technologies have been adopted in various telecommunication standards to provide a common protocol that enables different wireless devices to communicate on a municipal, national, regional, and even global level. An example telecommunication standard is 5G New Radio (NR).

5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. Interest has been shown in multiple subscriber identity module (MSIM) devices in which a device, such as a user equipment (UE), includes more than one subscriber identity module (SIM) to enable the device to have more than one subscription to one or more networks.

BRIEF SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may by a user equipment (UE), such as a Multiple Subscriber Identity Module (MSIM) UE. The apparatus may be configured to determine a first timing of a first set of paging occasions associated with a first network subscription of the multiple network subscriptions, wherein the first network subscription is associated with a first network; determine a second timing of a second set of paging occasions associated with a second network subscription of the multiple network subscriptions, wherein the second network subscription is associated with a second network; compare the first timing and the second timing; detect a paging time adjustment condition based on the comparing; and based on the detecting, transmit to the first network, the second network or both a random access signal using a random access resource configured to convey a paging time adjustment request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, 5A and 5B are timeline diagrams showing examples of paging occasion timings associated with multiple subscriber identity modules (MSIMs) for wireless communication according to some embodiments.

DETAILED DESCRIPTION

Figure 1:
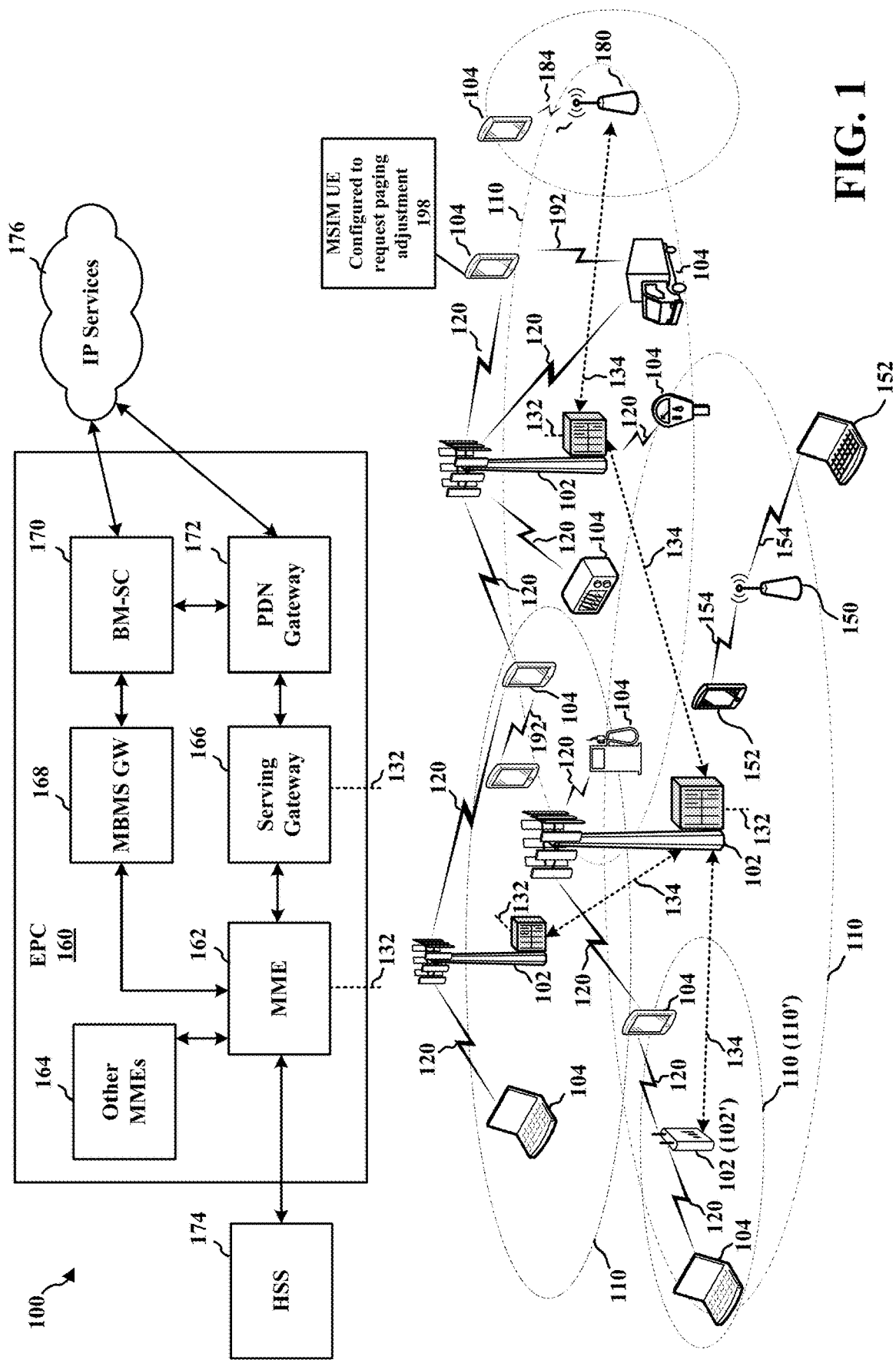
FIG. 1 is a diagram illustrating an example of a wireless communications system and an access network according to some embodiments.

The detailed description set forth below in connection with the appended drawings is intended as a description of various configurations and is not intended to represent the only configurations in which the concepts described herein may be practiced. The detailed description includes specific details to provide a thorough understanding of various concepts. However, it will be apparent to those skilled in the art that these concepts may be practiced without these specific details. In some instances, well-known structures and components are shown in block diagram form to avoid obscuring such concepts.

A Multiple Subscriber Identity Module (MSIM) capable User Equipment (UE) connected to one or more networks via multiple subscriptions may enter idle modes, or discontinuous reception (DRX) modes, with respect to the multiple subscriptions. In the idle or DRX modes, the UE may wake up during paging occasions to monitor for paging signals from the one or more networks. The timing of the paging occasions associated with the multiple subscriptions may lead to paging occasions of the multiple subscriptions to overlap, or collide, in time, which may impact the UE's ability to receive a paging signal from one or more of the multiple subscriptions and lead to paging signal reception errors. Alternatively, or in addition, the timing between paging occasions associated with the different subscriptions may lead to relatively frequent wake-ups. By identifying opportunities for improved alignment between paging occasions (e.g., to avoid paging collisions, or to time-align paging occasions), the UE may improve performance (e.g., reduce paging reception errors) and benefit from power-savings, and the UE may benefit from alignment between the paging occasions of the multiple subscriptions in which paging occasions associated with different subscriptions do not overlap but occur within a single wake-up cycle of the UE (e.g., reduce wake-up frequency).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., an X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase the capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station 102 may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a prosthetic, medical device, entertainment device, industrial equipment, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be a MSIM UE configured to request paging occasion adjustment 198. Paging occasion adjustment requests may be transmitted to one or more base stations 102 associated with a subscription, which subscription may be selected by the UE 104.

Figure 2:
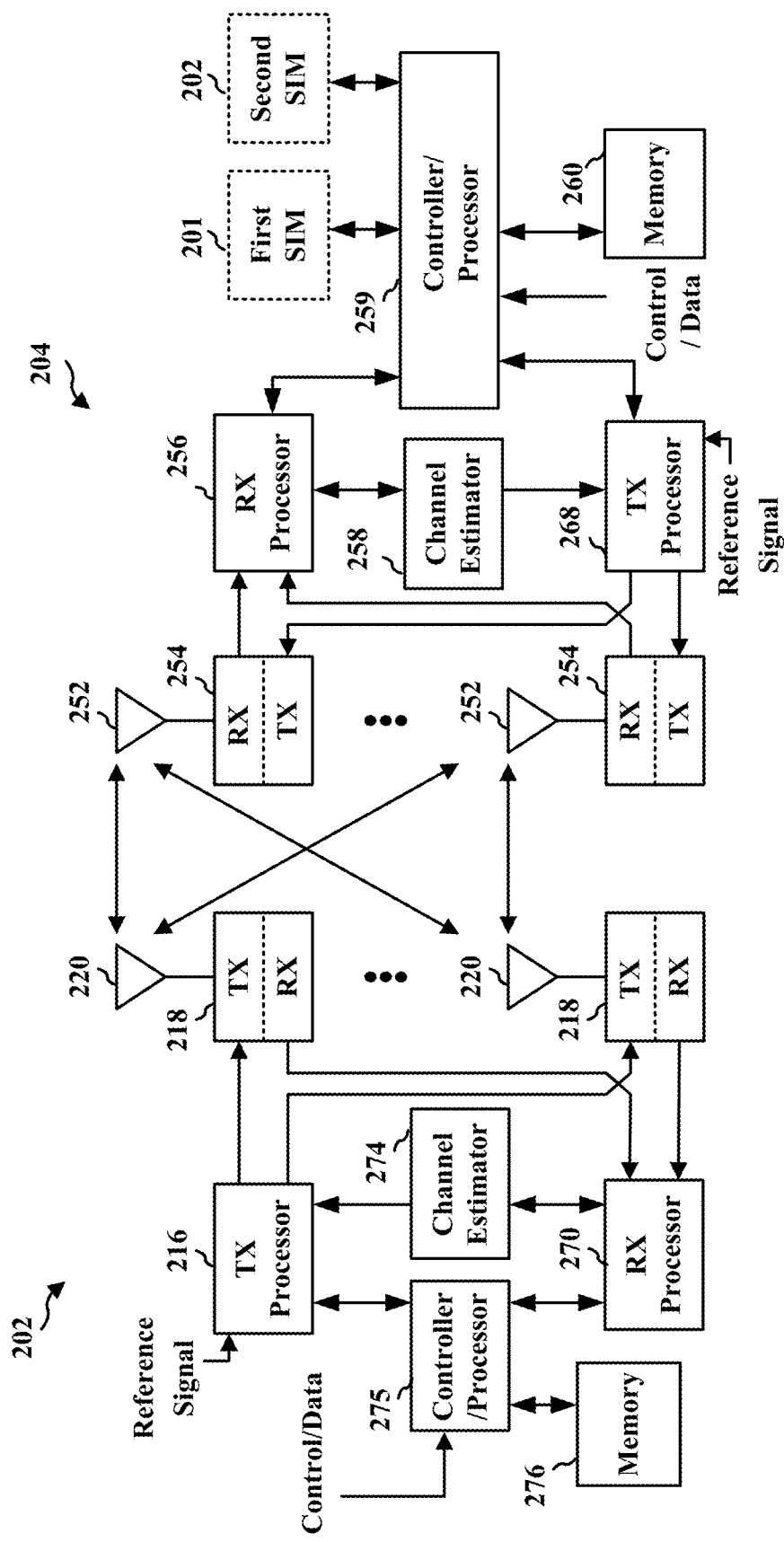
FIG. 2 is a diagram illustrating an example of a base station and user equipment (UE) in an access network according to some embodiments.

FIG. 2 is a block diagram of a base station 202 in communication with a UE 204 in an access network. In the DL, IP packets from the EPC 160 (shown in FIG. 1) may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 204. Each spatial stream may then be provided to a different antenna 220 via a separate transmitter 218TX. Each transmitter 218TX may modulate an RF carrier with a respective spatial stream for transmission.

At the UE 204, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 204. If multiple spatial streams are destined for the UE 204, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 202. These soft decisions may be based on channel estimates computed by the channel estimator 258. The soft decisions are then decoded and deinterleaved to recover the data and control signals that were originally transmitted by the base station 202 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 202, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 202 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 202 similarly to the receiver function at the UE 204. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 204. IP packets from the controller/processor 275 may be provided to the EPC 160. The controller/processor 275 is also responsible for error detection using an ACK and/or NACK protocol to support HARQ operations.

Various wireless communication technologies may have a different frame structure and/or different channels. A frame may be divided into multiple (e.g., 10) equally sized subframes. Each subframe may include multiple consecutive time slots (based on the type of numerology). A resource grid may be used to represent time slots, each time slot may include one or more time concurrent resource blocks (RBs) (also referred to as physical RBs (PRBs)). The resource grid is divided into multiple resource elements (REs). For a normal cyclic prefix, an RB may contain consecutive subcarriers in the frequency domain and consecutive symbols in the time domain. The number of bits carried by each RE depends on the modulation scheme.

Some of the REs may carry reference (pilot) signals (RS) for downlink channel estimation at the UE. These RS may include cell-specific reference signals (CRS) (also sometimes called common RS), UE-specific reference signals (UE-RS), and channel state information reference signals (CSI-RS).

Various channels may exist within a DL subframe. The PDCCH carries downlink control information (DCI) within one or more control channel elements (CCEs), each CCE including multiple RE groups (REGs), each REG including a number of consecutive REs in an OFDM symbol. A UE may be configured with a UE-specific enhanced PDCCH (ePDCCH) that also carries DCI. The physical hybrid automatic repeat request (ARQ) (HARQ) indicator channel (PHICH) carries the HARQ indicator (HI) that indicates HARQ acknowledgement (ACK)/negative ACK (NACK) feedback based on the success of decoding a physical uplink shared channel (PUSCH). A primary synchronization signal (PSS) may serve to determine subframe/symbol timing and a physical layer identity. A secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the downlink RS. A physical broadcast channel (PBCH), carries a master information block (MIB). The PBCH may be logically grouped with the PSS and SSS to form a synchronization signal (SS) block (SSB). The MIB provides system configuration information, including a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

Uplink subframes may include REs that carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

A physical random access channel (PRACH) may be within one or more subframes within a frame based on the PRACH configuration. The PRACH may include consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

A wireless communication device may include one or more subscriber identity modules (SIMs) that provide access to one or multiple separate mobile communication networks that implement certain radio access technologies (RATs). Example UEs include, but are not limited to, mobile phones, laptop computers, smartphones, and other mobile communication devices of the like that are configured to connect to one or more RATs. These devices may have Multiple Subscriber Identity Module (MSIM) capability. FIG. 2, for example, illustrates a UE having multiple SIMs (e.g., a first SIM 201 and a second SIM 202). Although two SIMs are illustrated, aspects described herein may be similarly applied to a device comprising more than two SIMs. Having multiple SIMs may enable a single device to use different numbers for voice calls or other services. Multiple SIMs may enable the device to operate using more than one network subscription and/or more than one network. Such a wireless communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), 5G New Radio (NR), Global System for Mobility (GSM), and Wideband Code Division Multiple Access (WCDMA)). To use different frequency systems and/or radio access technologies, a wireless communication device may include two or more radio transceivers.

As noted, a SIM enables the wireless communication device to access one or more communication networks (or one or more subscriber accounts on the same network). A SIM card may identify and authenticate a subscriber using a particular communication device, and the SIM card may be associated with a subscription. In various embodiments, the wireless communication device may also include one or more RF resource chains that may each be used for RF reception and transmission. As used herein, the terms "SIM," "SIM card," "subscriber identity module," and variants thereof are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information stored in a particular SIM, as the SIM and the communication network (as well as the services and subscriptions supported by that network) correlate to one another. Similarly, the term "subscription" (SUB) may refer to a network subscription or service associated with a particular SIM.

In general, a wireless device that includes multiple SIMs and can be connected to two or more separate (or the same) RATs using the same transmission hardware (e.g., radio-frequency (RF) transceivers) is a multi-SIM-multi-standby (MSMS) communication device. In one example, the MSMS communication device may be a dual-SIM-dual-standby (DSDS) communication device, which may include two SIM cards/subscriptions that may both be active on standby, but one is deactivated when the other one is in use. In another example, the MSMS communication device may be a triple-SIM-triple-standby (TSTS) communication device, which includes three SIM cards/subscriptions that may all be active on standby, where two may be deactivated when the third one is in use. In other examples, the MSMS communication device may include other suitable multi-SIM communication devices, with, for example, four or more SIMs, such that when one is in use, the others may be deactivated.

On the other hand, a wireless device with multiple SIMs that can connect to two or more separate (or the same) RATs using two or more separate sets of transmission hardware is termed a multi-SIM-multi-active (MSMA) communication device. An example MSMA communication device is a dual-SIM-dual-active (DSDA) communication device, which includes two SIM cards/subscriptions. Both SIMs may remain active. In another example, the MSMA device may be a triple-SIM-triple-active (TSTA) communication device, which includes three SIM cards/subscriptions. All three SIMs may remain active. In other examples, the MSMA communication device may include other suitable MSIM communication devices with four or more SIMs, which may all be active.

Various aspects and embodiments described herein relate to, but are not limited to, a MSIM context such as the MSMS and MSMA contexts. For example, in the MSIM context, each subscription may be configured to acquire service from a base station (associated with a given cell). For clarity, various aspects and embodiments described herein refer to a UE with two subscriptions. However, a UE with only one SIM and one subscription may suitably implement various aspects and embodiments described herein, as can a UE with three or more SIMs and three or more subscriptions.

By example, a common MSIM device may include a dual-SIM UE (such as DSDS or DSDA device). Such a MSIM UE may be a 5G+5G MSIM device (including two 5G SIMs corresponding to two 5G subscriptions) or a 5G+4G MSIM device (including one 5G SIM and one LTE SIM corresponding to a 5G subscription and a 4G LTE subscription). In a common scenario, the MSIM UE may be configured with two SIMs for the same operator, e.g., a user may install one SIM for business/official and another SIM for personal use in a single UE hardware device. In such scenarios, both SIMs commonly correspond to the same network operator, a configuration referred to hereinafter as Intra-PLMN. A MSIM UE configured as Intra-PLMN, may perform redundant operations with the same network when initializing, configuring, and updating the respective network subscriptions associated with each SIM. Among the redundant operations that may be performed by dual-SIM UE is SIB acquisition for on-demand SIBs.

NR, like LTE and other legacy technologies, includes periodic transmission of system information. However, unlike LTE and legacy technology, not all system information in NR is periodically transmitted. NR includes to two types of SIBs. One SIB type is transmitted periodically, like LTE, and the other is transmitted on-demand (e.g., when requested by the UE). A 5G network will primarily broadcast critical system information like MIB and SIB1 periodically. However, non-critical system information will be transmitted on-demand, in response to UE requests. UEs can trigger the transmission of on-demand SIBs by sending a RACH requesting a SIB transmission. This may be referred to as a system information (SI)-RACH. The SI-RACH uses a unique preamble to trigger SI transmission by the network. SIB1, sent periodically, indicates which other SIBs are periodic and which SIBs are on-demand. By reading SIB1, a UE can determine which SIBs require a RACH trigger.

Various aspects and embodiments described herein relate to, but are not limited to, a MSIM context such as the MSMS and MSMA contexts. For example, in the MSIM context, each subscription may be configured to acquire service from a base station (associated with a given cell). For clarity, various aspects and embodiments described hereinafter as an MSIM UE may refer to a MSIM UE with two subscriptions to the same network operator (e.g., a MSIM Intra-PLMN) or different network operators (e.g., a MSIM Inter-PLMN). However, a UE with three or more SIMs and three or more subscriptions may suitably implement various aspects and embodiments described herein. The MSIM UE may be a 5G+5G MSIM Intra-PLMN or Inter-PLMN UE or 5G+4G MSIM Intra-PLMN or Inter-PLMN UE including a first SIM and a second SIM. Furthermore, reference will be made to a first subscription associated with the first SIM and a second subscription associated with the second SIM. Both the first subscription and the second subscription may be associated with the same cellular network or different cellular networks. Additionally, while reference hereinafter is made to a dual-SIM device, the described concepts are equally applicable to multi-SIM Intra-PLMN or Inter-PLMN devices that have three or more active SIMs and subscriptions.

A MSIM UE connected to one or more networks via multiple subscriptions may receive paging signals for each subscription during an idle or DRX mode. The paging occasions associated with the multiple subscriptions may collide with each other or may not be efficiently time-aligned such that the UE wakes up relatively frequently. In the context of collisions, there may be a relatively high probability for paging collisions to occur in 5G+5G (e.g., NR+NR) or 5G+4G (e.g., NR+LTE) MSIM UEs. Considerations have been made in 5G to allow for a paging frame (PF) offset (PF-offset) to reduce collisions. In various aspects herein, UE feedback may be utilized to improve decisions for adjusting paging occasion timing. Information available at the UE may be considered (e.g., by instructions stored on a memory and executed by a processor of the UE) to determine whether the UE may benefit from an adjustment to the paging occasion timing (e.g., to avoid collisions or to time-align paging occasions) associated with one or more subscriptions.

Figure 3:
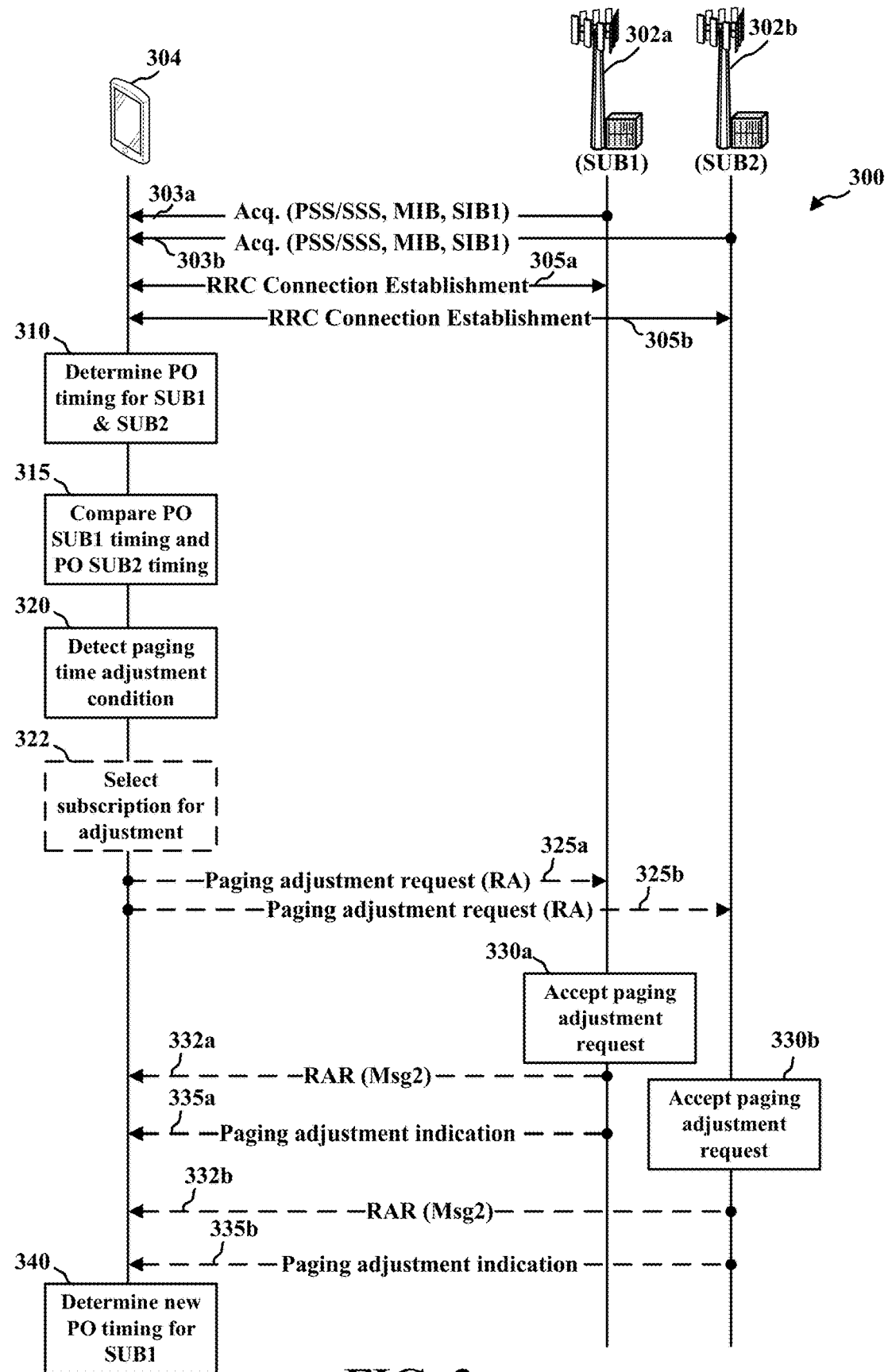
FIG. 3 is a communication diagram 300 illustrating signaling and operations performed by a UE and base stations according to some embodiments.

FIG. 3 is a communication diagram 300 illustrating signaling and operations performed by base stations 302a, 302b and a UE 304. The base stations 302a, 302b may be any type of base station including gNB, eNB, NB, etc. The UE 304 may be a MSIM UE. The base station 302a may be associated with a first subscription (SUB1), and the UE 304 may communicate with the base station 302a via SUB1 using a first SIM of the UE 304. The base station 302b may be associated with a second subscription (SUB2), and the UE 304 may communicate with the base station 302b via SUB2 using a second SIM of the UE 304. The communication diagram illustrates an aspect, whereby the MSIM communication enables improvements to paging occasion timing adjustment. Although base station 302a and base station 302b are depicted as separate base stations, they may correspond to the same base station that provides multiple subscriptions to the UE 304, and the multiple subscriptions may correspond to the same RAT (e.g., 5G+5G) or different RATs (e.g., 5G+4G). Aspects of the communication diagram 300 may correspond to initial connection establishment, mobility registration and/or a periodic registration between the UE 304 and the corresponding network.

At 303a, the UE 304 receives acquisition signals (e.g., synchronization signals such as, for example, a primary synchronization signal (PSS) and a secondary synchronization signal (SSS), information blocks such as a master information block (MIB) and system information block 1 (SIB1), etc.) from the base station 302a associated with SUB1. In one aspect, information associated with the acquisition signals of 303a may enable the UE 304 to determine a PF-offset used by the base station 302a. For example, SIB1 may include an indication of the PF-offset used by the base station 302a. At 303b, the UE 304 receives acquisition signals (which may be the same or different from the acquisition signals of 303a) from base station 302b associated with SUB2. In one aspect, information associated with the acquisition signals of 303b may enable the UE 304 to determine a PF-offset used by the base station 302b. For example, SIB1 may include an indication of the PF-offset used by the base station 302b.

At 305a, the UE 304 exchanges signals with the base station 302a to establish a radio resource control (RRC) connection with base station 302a. The signals associated with establishing the RRC connection may include random access (RA) signals (e.g., RA preamble, RA response, RRC connection request, RRC connection setup, RRC connection complete). At 305b, the UE 304 exchanges signals (e.g., RA signals) with the base station 302b to establish an RRC connection with the base station 302b.

At 310, the UE 304 determines the paging occasion timing associated with SUB1 and SUB2. During the RRC establishment procedure at 305a (e.g., after a REGISTRATION ACCEPT), the UE 304 may have information (e.g., received information from the base station 302a) that allows it to determine idle/DRX parameters, including paging occasion timing, associated with SUB1. For example, in the context of 5G, during RRC connection establishment, the UE 304 may be assigned a 5G global unique temporary identifier (GUTI) from which a 5G short-temporary mobile subscriber identity (5G-S-TMSI) associated with SUB1 may be derived. In this example, the UE 304 may determine the paging occasion timing for SUB1 from the 5G-S-TMSI associated with SUB1. Other RATs (e.g., 4G LTE) may include similar mechanisms or signaling, know to persons of ordinary skill, that enable a UE to determine paging occasion timing for the particular RAT associated with SUB1. Likewise, during the RRC establishment procedure at 305*b* (e.g., after a REGISTRATION ACCEPT), the UE 304 may have information (e.g., received information from the base station 302*a*) that allows it to determine idle/DRX parameters, including paging occasion timing, associated with SUB2. For example, in the context of 5G, during RRC connection establishment the UE 304 may be assigned a 5G GUTI from which a 5G-S-TMSI associated with SUB2 may be derived. In this example, the UE 304 may determine the paging occasion timing for SUB2 from the 5G-S-TMSI associated with SUB2. Other RATs (e.g., 4G LTE) may include similar mechanisms or signaling, know to persons of ordinary skill, that enable a UE to determine paging occasion timing for the particular RAT associated with SUB2.

At 315, the UE 304 may compare the paging occasion timing associated with SUB1 and the paging occasion timing associated with SUB2. In an aspect, instructions or software modules (e.g., TRM) stored at the UE 304 may determine or predict upcoming paging occasions for SUB1 and SUB2 and identify whether paging occasions of SUB1 will overlap or collide with paging occasions of SUB2 (as described in further detail below with reference to FIG. 4A), or whether paging occasions of SUB1 and SUB2 may be more efficiently time aligned so the UE 304 has to wake-up less frequently (as described in further detail below with reference to FIGS. 5A and 5B).

In the context of paging collisions, FIG. 4A depicts a timeline diagram 400*a* showing a timeline 401*a* of paging occasions (POs) 405*a*-405*d* associated with SUB1 (e.g., associated with SIM1 of the UE 304) and a timeline 402*a* of POs 410*a*-410*d* associated with SUB2 (e.g., associated with SIM2 of the UE 304). A paging occasion may correspond to a time in which the UE 304 wakes up from a sleep mode, period or interval (e.g., during a DRX cycle that includes a wake-up period and a sleep period) to monitor for a paging signal or message that may be sent from a base station. In one aspect, the timing of POs 405*a*-405*d* may correspond to an initial PF-offset signaled from the base station 302*a*. The initial PF-offset may be designated by "PF-offset (0)." In one aspect, the timing of POs 410*a*-410*b* may correspond to an initial PF-offset signaled from the base station 302*b*. As shown in FIG. 4A, some POs associated with SUB1 may overlap or collide with POs associated with SUB2. For example, a portion of PO 405*a* collides with a portion of PO 410*a*, and a portion of PO 405*b* collides with a portion of PO 410*b*. In one aspect, the UE 304 may determine that a collision will occur when at least a portion of a PO associated with one SUB will overlap with at least a portion of a PO associated with another SUB (e.g., as shown with respect to PO 405*a* and PO 410*a*). In one aspect, the UE 304 may determine that a collision will occur even if a portion of a PO of one SUB does not overlap with a portion of a PO of another SUB but the POs are relatively close in time. For example, FIG. 4A shows that PO 410*c* follows, in time, PO 405*c* and falls within a component transition time of the UE 304. The component transition time may correspond to a time that components of the UE 304 (e.g., RF components) need to transition (e.g., power up, power down and/or re-tune) to receive signals from different SUBs (e.g., that occur in different frequency bands). When POs do not overlap but fall within a component transition time, the UE 304 may also determine that a collision occurs. In a conventional system when collisions occur, a UE may alternative between SIMs in observing POs (e.g., a UE may monitor PO 405*a* for SIM1 while missing PO 410*a* and then monitor PO 410*b* for SIM2 while missing PO 405*b*).

In the context of time alignment of POs, FIG. 5A depicts a timeline diagram 500*a* showing a timeline 501*a* of POs 505*a* and 505*b* associated with SUB1 (e.g., associated with SIM1 of the UE 304), a timeline 502*a* of POs 510*a* and 510*b* associated with SUB2 (e.g., associated with SIM2 of the UE 304) and a timeline 503*a* showing the state of the UE 304. The state of the UE 304 includes awake periods 515*a* and sleep periods 520*a*-520*d*. Awake periods 515*a* correspond to intervals in which at least a portion of the UE 304 are powered-up so UE 304 may receive and/or transmit signals, and sleep periods 520*a*-520*d* correspond to intervals in which at least a portion of the UE 304 is powered-down to allow for power savings at the UE 304. As shown in FIG. 5A, POs 505*a*, 505*b*, 510*a*, and 510*b* occur during the awake periods 515*a* so the UE 304 can monitor for paging signals or messages from the respective base station 302*a* and 302*b*. The alignment of POs associated with the different SUBs is such that each PO falls within its own awake interval 515*a* (e.g., POs from different SUBs do not share a common awake interval). This alignment may lead to relatively frequent wake-ups of the UE 304.

Referring to 320 at FIG. 3, the UE 304 may detect a paging time adjustment condition based on the comparison of paging occasions at 310. A paging time adjustment condition may correspond to different conditions determinable by the UE 304. In an aspect, a paging time adjustment condition may be based on determined or predicted paging collisions that may occur between SUBs. In an aspect, a paging adjustment condition may be based on a time alignment between paging occasions of different SUBs.

In one aspect, a paging time adjustment condition may be based on a page collision, or contention, percentage over a period of time (T), which corresponds to the percentage of paging occasions of one SUB that collide with paging occasions of another SUB over T. The page collision percentage may be represented by a parameter "C." The page collision percentage C may be associated with a particular PF-offset for paging occasions of a SUB. Referring to FIG. 4A, for the PF-offset (0) of SUB1, the page collision percentage C for the time period shown may be 75%, or three out of four POs of SUB1 that collide with POs of SUB2 (considering that PO 405*c* and PO 410*c* collide within the component transition time).

The page collision percentage C may be compared to a threshold S, which may be configured and/or adapted by the UE 304 or a network, to determine whether a paging time adjustment condition occurs or is satisfied. For example, if the page collision percentage C is greater than the threshold S, the UE 304 may determine that a paging time adjustment condition occurs.

In some aspects, UEs and base stations may be configured to communicate using multiple different PF-offsets at different times. Each different PF-offset may correspond to a different timing of POs. In one aspect, paging occasion timing associated with one or more other PF-offsets not indicated in SIB1 (e.g., during acquisition 303*a* and/or 303*b*) may be considered by the UE 304 to detect a paging time adjustment condition. For example, if less collisions would occur, or POs of different SUBs would be more efficiently time-aligned, using a different PF-offset than the one signaled by the base station, the UE 304 may detect a paging time adjustment condition.

FIG. 4B depicts a timeline diagram 400*b* showing a timeline 401*b* of POs 405*a*'-405*d*' associated with SUB1 and a timeline 402b of POs 410a'-410d' associated with SUB2. The timing of POs 405a'-405d' may be associated with a PF-offset (X) that is different from the one indicated as being used by the base station 302a. Based on information obtained during acquisition (e.g., 303a, 303b) and/or RRC connection establishment (305a, 305b), the UE 304 may determine the timing of POs (such as POs 405a'-405d') associated with other PF-offsets that are different from the PF-offset indicated as being used by the base station 302a. The POs 405a'-405d' using PF-offset (X) are shifted in time in comparison to POs 405a-405d using PF-offset (0).

The UE 304 may compare the timing of POs 405a'-405d' using PF-offset (X) for SUB1 to the timing of POs 410a-410d of SUB2 to determine the number, or percentage, of collisions between the POs of the different SUBs. In this example, one out of four POs collide, or a page collision percentage "C'" of 25% is associated with PF-offset (X) (considering that PO 405d' and PO 410d collide within the component transition time). The page collision percentage C' corresponding to PF-offset (X) may be compared to the page collision percentage C corresponding to PF-offset (0), and the UE 304 may detect a page time adjustment condition if the page collision percentage C' (using PF-offset (X)) is less than the page collision percentage C (using PF-offset (0)). In another aspect, the UE 304 may compare the page collision percentage C (using PF-offset (0)) to the threshold S. If C>S, the UE 304 may compare page collision percentage C to page collision percentage C' (using PF-offset (X)) and detect a page time adjustment condition if C>C'. In another aspect, the UE 304 may determine a page time adjustment condition if C>S>C'. In the above example, timing of POs with respect to PF-offset (0) and PF-offset (X) were considered. The UE 304 may consider PF-offset (0) and the timing of POs of multiple other PF-offsets that are configured for communication between the UE 304 and the base station 302a and detect a page time adjustment condition if at least one of the other PF-offsets has a lower collision percentage than the PF-offset in current use by the base station. The UE 304 may also identify the PF-offset with the lowest page collision percentage. The description with respect to FIGS. 4A and 4B pertained to considering different PF-offsets for SUB1. The UE 304 may consider the timing of POs of SUB2 using different PF-offsets in addition to, or instead of, considering the timing of POs of SUB1 using different PF-offsets. In one aspect, the UE 304 may determine to request adjustment of the POs of both SUB1 and SUB2. In another aspect, the UE 304 may determine to request adjustment of the POs of only one SUB (e.g., SUB1 or SUB2).

As referenced above, detection of a page time adjustment condition may correspond to a determination by the UE 304 that POs of different SUBs may be more efficiently time-aligned so the UE has to wake up less frequently. FIG. 5B depicts a timeline diagram 500b showing a timeline 501b of POs 505a' and 505b' associated with SUB1 (e.g., associated with SIM1 of the UE 304), a timeline 502b of POs 510a' and 510b' associated with SUB2 (e.g., associated with SIM2 of the UE 304) and a timeline 503b showing the state of the UE 304, which includes awake periods 515b and sleep periods 520a'-520c'. The timing of POs 505a' and 505b' are associated with a PF-offset (X), which is different from PF-offset (0) of FIG. 5A, that was indicated for use by the base station 302a. As shown in FIG. 5B, PO 510a' may occur after PO 505a' (but outside a component transition time) and within a time so that the UE 304 may remain awake during one awake period 515b. In comparison to FIG. 5A, the UE 304 transitions to sleep (520a) between POs 505a and 510a. In FIG. 5B, the UE 304 transitions to the sleep interval 520b' between PO 510a' and PO 505b'. The sleep interval 520b', using PF-offset (X), may be longer in duration than the sleep interval 520b, using PF-offset (0), which allows the UE 304 to be continuously powered-down for a longer period of time. The UE 304 may consider the alignment between POs of different SUB s using different PF-offsets. If a different PF-offset provides a better time alignment (e.g., less frequent wake-ups and longer sleep intervals) than the PF-offset used by the base station 302a, the UE 304 may detect a page time adjustment condition. The UE 304 may consider the time-alignment of multiple other PF-offsets and detect a page time adjustment condition if at least one other PF-offset provides a better time alignment. The UE 304 may also identify the PF-offset that enables the UE 304 to have the least frequent wake-ups and the longest sleep intervals over a period of time. The description with respect to FIGS. 5A and 5B pertained to considering different PF-offsets for SUB1. The UE 304 may consider the timing of POs of SUB2 using different PF-offsets in addition to, or instead of, considering the timing of POs of SUB1 using different PF-offsets. In one aspect, the UE 304 may determine to request adjustment of the POs of both SUB1 and SUB2. In another aspect, the UE 304 may determine to request adjustment of the POs of only one SUB.

At 322, the UE 304 may select SUB1 or SUB2 for PO timing adjustment. In one aspect, the POs of both SUB1 and SUB2 may be adjustable (e.g., through the use of PF-offsets) . In one example, SUB1 and SUB2 may correspond to dual 5G subscriptions. The UE 304 may consider various factors to select the SUB for PO timing adjustment including the type of service associated with the SUB. Some services may have higher priority over other services, and the UE 304 may trigger PO adjustment for the SUB with the lower priority. The priority rankings of services may be configurable per network or per UE. In one example, SUB1 may be associated with (e.g., enrolled for) voice services (e.g., voice over NR (VoNR)) and SUB2 may be associated with (e.g., enrolled for) data services. Voice services may have a higher priority compared to data services. The UE 304 may trigger PO timing adjustment (e.g., through PF-offset adjustment) for SUB2, which has a lower service priority. In some aspects, the POs of only one SUB may be adjustable (e.g., POs of SUB1 are adjustable and POs of SUB2 are not), and the UE 304 may not consider whether to select one SUB over the other for PO timing adjustment.

If the UE 304 detects a paging time adjustment condition at 320, the UE 304 may transmit a paging adjustment request 325a to the base station 302a, the UE 304 may transmit a paging adjustment request 325b to the base station 302b, or the UE 304 may transmit both paging adjustment requests 325a and 325b to, respectively, base station 302a and 302b. The paging adjustment request (325a and/or 325b) may correspond to a random access signal or message (e.g., Msg1) that is configured to convey a paging time adjustment request to the base station 325a and/or base station 325b. The random access signal may be associated with a random access resource that is dedicated to convey a paging time adjustment request. In one aspect, an SI-RACH may be established (e.g., a PageCollision-RACH) for paging time adjustment. A network (e.g., base station 302a, base station 302b) may configure the SI-RACH with dedicated resources, such as RRC IEs or configurations. The base station 302a and/or 302b may communicate the SI-RACH configurations to the UE 304 during system acquisition 303a and/or 303b. The SI-RACH may include a preamble that is dedicated to convey a request for paging time adjustment, a unique configuration index (e.g., a physical RACH (PRACH) configuration index) for different UEs, a synchronization signal block (SSB) RACH occasion, and other information for RACH.

When the UE 304 detects the paging time adjustment condition at 320 the UE 304 may then use the corresponding RACH preamble and configuration index to trigger RA Msg1, which will signal to the base station 302a and/or 302b that the UE 304 is requesting an adjustment to the paging time (e.g., to use a different PF-offset).

If the paging adjustment request 325a is sent to the base station 302a, the base station 302a receives the request 325a and determines whether to accept (330a) or reject the request 325a. Likewise, if the paging adjustment request 325b is sent to the base station 302b, the base station 302b receives the request 325b and determines whether to accept (330b) or reject the request 325b. The base station 302a and/or 302b may consider how a change in the PO timing may impact other network operations and communications with other UEs in determining whether to accept (330a and/or 330b) the paging adjustment request 325a and/or 325b.

If the paging adjustment request 325a is sent to, and received by, the base station 302a, the base station 302a responds to the SI-RACH (Msg1) with a random access response (Msg2) at 332a, which acknowledges to the UE 304 that the base station 302a received the SI-RACH. Likewise, if the paging adjustment request 325b is sent to, and received by, the base station 302b, the base station 302b responds to SI-RACH (Msg1) with a random access response (Msg2) at 332b, which acknowledges to the UE 304 that the base station 302b received the SI-RACH.

If the base station 302a accepts, at 330a, the request 325a the base station 302a transmits to the UE 304 a paging adjustment indication 335a, which signals to the UE 304 that the base station 302a has accepted the paging time adjustment request conveyed using the random access resource. Similarly, if the base station 302b accepts, at 330b, the request 325b the base station 302b transmits to the UE 304 a paging adjustment indication 335b, which signals to the UE 304 that the base station 302b has accepted the paging time adjustment request conveyed using the random access resource. The UE 304 may continue to monitor signals from the base station 302a and/or 302b using the existing PF-offset until the UE 304 receives the paging adjustment indication 335a and/or 335b. In one aspect, the indication 335a and/or indication 335b includes a short message SIB change indication, which notifies the UE 304 that a parameter of a SIB (e.g., SIB1) has changed and that the UE 304 should read (e.g., decode) the SIB to receive the new parameter. In one aspect, the indication 335a and/or 335b includes the short message change indication and a new PF-offset parameter communicated in SIB1.

At 340, the UE 304 determines a new PO timing for SUB1 and/or SUB2 based on the paging adjustment indication in 335a and/or 335b. If a new PO timing is indicated by the base station 302a and/or 203b, the UE 304 adjusts its sleep and awake cycle accordingly. The description with respect to FIGS. 3, 4A, 4B, 5A and 5B relate to a UE 304 with two SIMs and two related subscriptions. It is contemplated, however, that the aspects described above are applicable to systems in which UEs have more than two SIMs related to more than two subscriptions.

Figure 6:
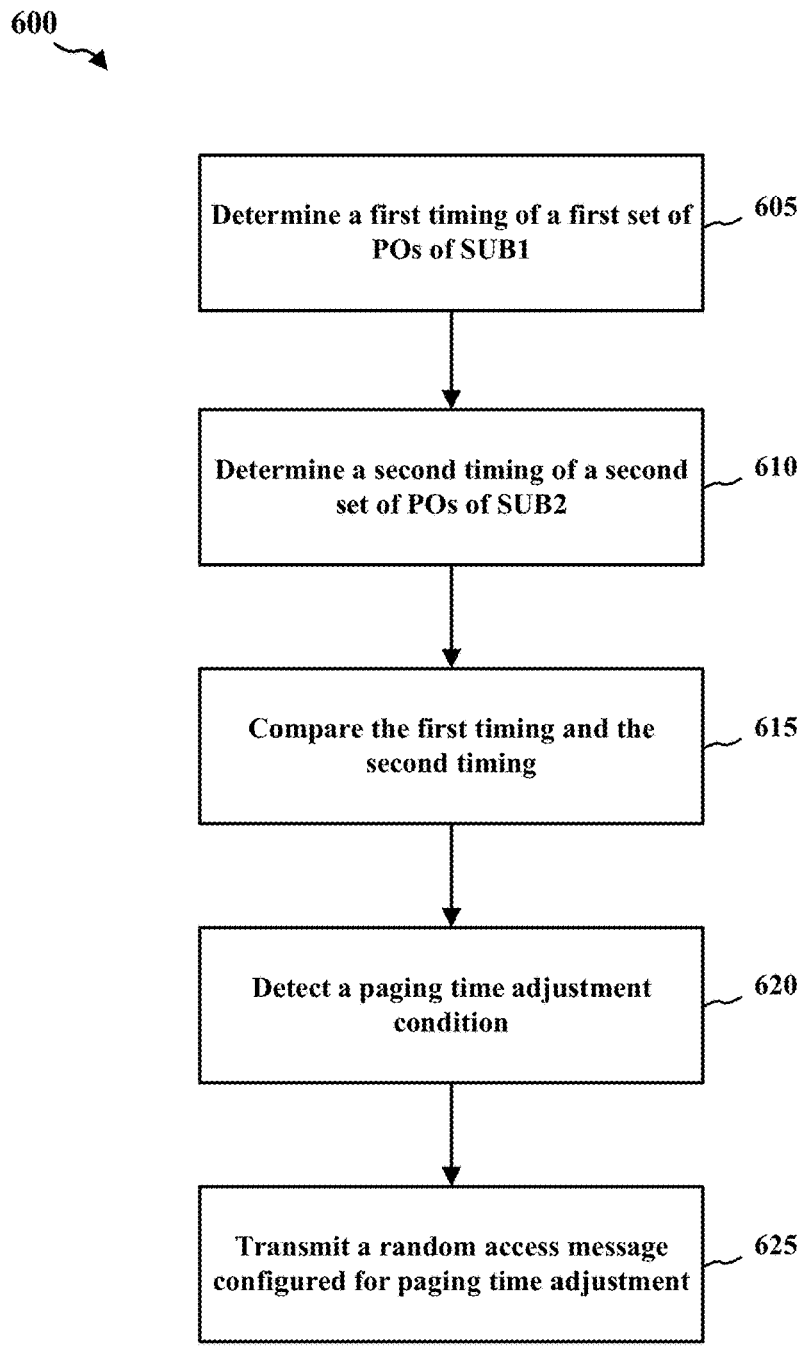
FIG. 6 is a flowchart illustrating a method of wireless communication according to some embodiments.

FIG. 6 is a flow chart 600 of a method of wireless communication. The method may be performed by a UE (e.g., the UE 104, 250, 304; the apparatus 702, 802). The UE may be a MSIM UE. The method may improve paging signal reception performance and/or improve power savings by enabling coordination of the timing of paging occasions associated with different SIMs or subscriptions.

At 605, the UE determines a first timing of a first set of paging occasions associated with a first subscription. In one aspect, the UE may determine the first timing of the first set of paging occasions as described with reference to 310 of FIG. 3.

At 610, the UE determines a second timing of a second set of paging occasions associated with a second subscription. In one aspect, the UE may determine the second timing of the second set of paging occasions as described with reference to 310 of FIG. 3.

At 615, the UE compares the first timing of the first set of paging occasions and the second timing of the second set of paging occasions. In one aspect, the UE may compare the first timing and the second timing as described with reference to 315 of FIG. 3.

At 620, the UE detects a paging time adjustment condition based on the comparison of the first timing of the first set of paging occasions and the second timing of the second set of paging occasions. The paging time adjustment condition may correspond to a certain number of collisions over time or an improvement in time-alignment between POs of the first and second sets. In one aspect, the UE may detect the paging time adjustment condition as described with reference to 320 of FIG. 3 and as further described in the examples of FIGS. 4A, 4B, 5A and 5B.

At 625, the UE transmits a random access signal (or message) configured for paging time adjustment to a base station in response to detecting the paging time adjustment condition. The random access signal may be associated with a random access resource configured to convey a paging time adjustment request. In one aspect, the random access signal may be associated with a configuration that includes a random access preamble dedicated to convey the paging time adjustment request. In one aspect, the random access signal may be associated with a configuration that includes a unique random access configuration index for the UE. In one aspect, the UE may transmit the paging frame offset adjustment request as described with reference to 325a and/or 325b of FIG. 3.

Figure 7:
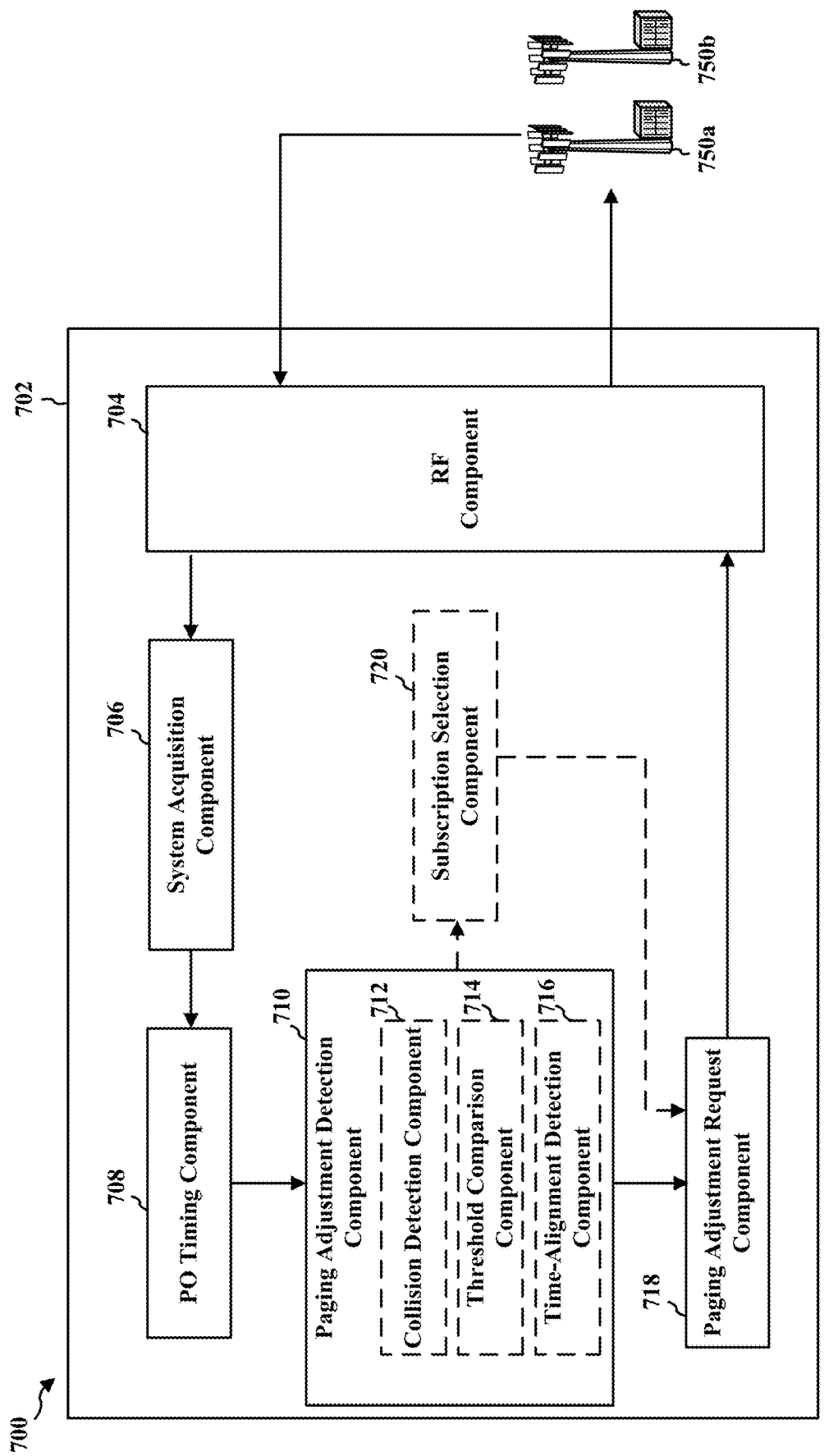
FIG. 7 is a conceptual data flow diagram illustrating the data flow between different means/components according to some embodiments.

FIG. 7 is a conceptual data flow diagram 700 illustrating the data flow between different means/components in an exemplary apparatus 702. The apparatus may be a UE. The apparatus 702 includes an RF component 504, a system acquisition component 506, a paging occasion timing component 708, a paging adjustment detection component 710 and a paging adjustment request component 718. The paging adjustment detection component 710 may include a collision detection component 712, a threshold detection component 714 and a time-alignment detection component 716. The apparatus 702 may also include a subscription selection component 720.

RF Component 704 receives transmissions from base stations 750a, 750b. System acquisition component 506 obtains system acquisition information (synchronization signals, information blocks) from signals received from base stations 750a, 750b and may process signals to establish an RRC connection with base stations 750a, 750b. Paging occasion timing component 510 determines the timing of paging occasions associated with subscriptions associated with base stations 750a, 750b. The timing may be determined based on information obtained by system acquisition component 706 during system acquisition and RRC establishment. selects a subscription for performing a random access procedure with the base station 550.

Paging adjustment detection component 710 detects paging timing adjustment conditions based on the paging occasion timing determined by paging occasion timing component 708. In one aspect, paging adjustment detection component 710 includes collision detection component 712 and threshold detection component 714. Collision detection component 712 detects collisions between paging occasions of different subscriptions. Threshold comparison component 714 compares the number, or percentage, of collisions over time detected by collision detection component 712 to a configurable threshold. In one aspect, if the number, or percentage, of collisions exceeds a threshold paging adjustment detection component 710 detects a paging time adjustment condition. Collision detection component 712 may compare paging occasions corresponding to different offsets not in current use by base station 750*a* and/or base station 750*b*. In one aspect, paging adjustment detection component 710 includes a time-alignment detection component 716, which detects whether paging occasions of different subscriptions may be aligned to occur within a single wake-up period and sleep periods extended. If a paging frame offset not in use by the base station 750*a* and/or 750*b* improves paging occasion alignment, compared to the offset in use, paging adjustment detection component 710 may detect a paging timing adjustment condition.

Paging adjustment request component 718 generates a request (e.g., an SI-RACH) to adjust the paging occasion timing of base station 750*a* and/or 750*b* in response to paging adjustment detection component 710 detecting a paging timing adjustment condition. The request is communicated to RF component 704 for transmission to base station 750*a* and/or 750*b*. Subscription selection component 720 may be used to select a subscription for adjustment. The selection may be based on the types of services associated with the subscriptions.

The apparatus 702 may include additional components that perform each of the blocks of the communication diagram of FIG. 3 and/or the flowchart of FIG. 6. As such, each block in the communication diagram of FIG. 3 and/or the flowchart of FIG. 6 may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
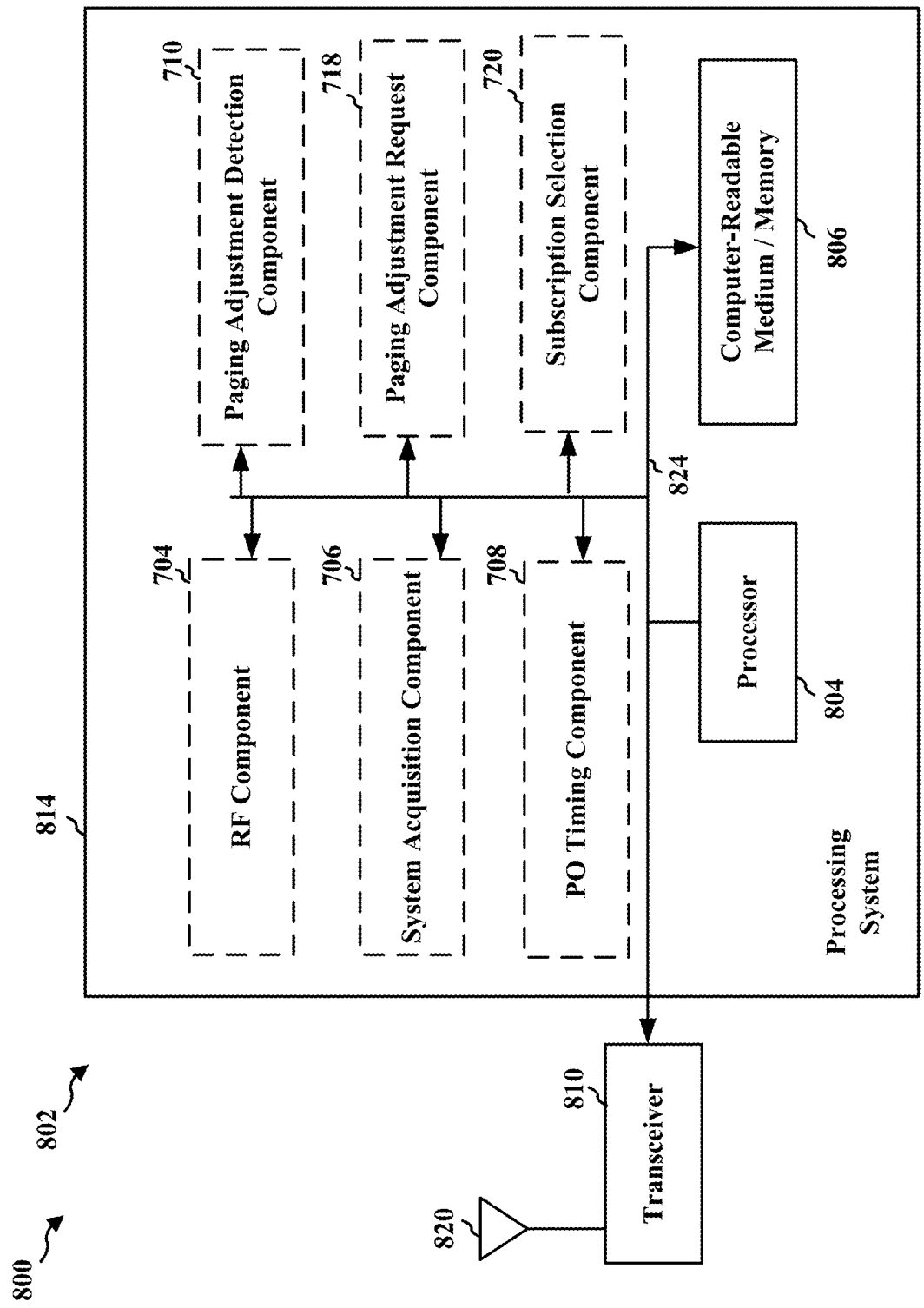
FIG. 8 is a diagram illustrating an example of a hardware implementation for an apparatus employing a processing system according to some embodiments.

FIG. 8 is a diagram 800 illustrating an example of a hardware implementation for an apparatus 802 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, RF component 704, system acquisition component 706, paging occasion timing component 708, paging adjustment detection component 710, paging adjustment request component 718, subscription selection component 720, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814. In addition, the transceiver 810 receives information from the processing system 814, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 718, and 720. The components may be software components running in the processor 804, resident/stored in the computer readable medium/memory 806, one or more hardware components coupled to the processor 804, or some combination thereof. The processing system 814 may be a component of the UE 250 and may include the memory 260 and/or at least one of the TX processor 268, the RX processor 256, and the controller/processor 259.

In one configuration, the apparatus 702/802 for wireless communication includes means for determining a first timing of a first set of paging occasions associated with a first network subscription of the multiple network subscriptions, wherein the first network subscription is associated with a first network; means for determining a second timing of a second set of paging occasions associated with a second network subscription of the multiple network subscriptions, wherein the second network subscription is associated with a second network; means for comparing the first timing and the second timing; means for detecting a paging time adjustment condition based on the comparing; and means for transmitting, based on the detecting, a paging frame offset adjustment request to the first network, the second network or both.

The aforementioned means may be one or more of the aforementioned components of the apparatus 702 and/or the processing system 814 of the apparatus 802 configured to perform the functions recited by the aforementioned means. As described supra, the processing system 814 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE) associated with multiple network subscriptions, comprising:
   determining a first timing of a first set of paging occasions associated with a first network subscription of the multiple network subscriptions, wherein the first network subscription is associated with a first network;
   determining a second timing of a second set of paging occasions associated with a second network subscription of the multiple network subscriptions, wherein the second network subscription is associated with a second network;
   determining a percentage of paging occasions of the first set that collide in time with paging occasions of the second set;
   comparing the percentage to a threshold;
   detecting a paging time adjustment condition in response to the percentage being greater than the threshold; and
   based on the detecting, transmitting to the first network, the second network or both a random access signal using a random access resource configured to convey a paging time adjustment request.

2. The method of claim 1, wherein:
   determining the first timing comprises determining timing of the first set of paging occasions based on an attach procedure associated with the first network subscription, and
   determining the second timing comprises determining timing of the second set of paging occasions based on an attach procedure associated with the second network subscription.

3. The method of claim 1, wherein the paging time adjustment condition includes a paging collision between one or more paging occasions of the first set and one or more paging occasions of the second set.

4. The method of claim 1, wherein the paging time adjustment condition includes a timing alignment between one or more paging occasions of the first set and one or more paging occasions of the second set such that a paging occasion of the first set and a paging occasion of the second set occur in time proximity to one another without the UE entering a sleep mode between the paging occasion of the first set and the paging occasion of the second set.

5. The method of claim 1, wherein the first timing of the first set of paging occasions corresponds to a first paging frame offset.

6. The method of claim 1, further comprising:
   receiving a configuration for the random access resource configured to convey the paging time adjustment request.

7. The method of claim 6, wherein the configuration comprises a random access resource dedicated to convey the paging time adjustment request.

8. The method of claim 7, wherein the transmitting comprises transmitting the random access signal using the random access resource dedicated to convey the paging time adjustment request.

9. The method of claim 6, wherein the configuration comprises a random access channel preamble dedicated to convey the paging time adjustment request.

10. The method of claim 9, wherein the configuration comprises a unique random access configuration index for the UE.

11. The method of claim 1, further comprising receiving an indication that the first network has accepted the paging time adjustment request conveyed using the random access resource.

12. The method of claim 11, wherein the indication is communicated to the UE in a system information block 1 (SIB1).

13. The method of claim 11, wherein the indication includes a short message system information block (SIB) change indication.

14. The method of claim 13, wherein the indication includes the short message SIB change indication and a new paging frame offset parameter in a system information block 1 (SIB1).

15. The method of claim 1, further comprising:
   determining a type of service associated with the first network subscription;
   selecting the first network subscription for paging time adjustment based on the type of service; and
   transmitting the random access signal to the first network based on the selecting.

16. The method of claim 15, further comprising:
   determining a first priority level associated with the type of service associated with the first network;
   determining a second priority level associated with a type of service associated with the second network subscription; and
   comparing the first priority level and the second priority level, wherein the selecting the first network subscription for paging time adjustment is further based on the comparing the first priority level and the second priority level.

17. An apparatus for wireless communication, comprising:
a processor;
memory coupled to the processor; and
instructions stored in the memory and operable, when executed by the processor, to cause the apparatus to:
determine a first timing of a first set of paging occasions associated with a first network subscription of multiple network subscriptions, wherein the first network subscription is associated with a first network;
determine a second timing of a second set of paging occasions associated with a second network subscription of the multiple network subscriptions, wherein the second network subscription is associated with a second network;
determine a percentage of paging occasions of the first set that collide in time with paging occasions of the second set;
compare the percentage to a threshold;
detect the paging time adjustment condition in response to the percentage being greater than the threshold; and
based on detection of the paging time adjustment condition, transmit to the first network, the second network or both a random access signal using a random access resource configured to convey a paging time adjustment request.

18. The apparatus of claim 17, wherein the paging time adjustment condition includes a paging collision between one or more paging occasions of the first set and one or more paging occasions of the second set.

19. The apparatus of claim 17, wherein the paging time adjustment condition includes a timing alignment between one or more paging occasions of the first set and one or more paging occasions of the second set such that a paging occasion of the first set and a paging occasion of the second set occur in time proximity to one another without the UE entering a sleep mode between the paging occasion of the first set and the paging occasion of the second set.

20. The apparatus of claim 17, wherein the instructions are further operable, when executed by the processor, to cause the apparatus to receive a configuration for the random access resource configured to convey the paging time adjustment request.

21. The apparatus of claim 20, wherein the configuration comprises a random access resource dedicated to convey the paging time adjustment request.

22. The apparatus of claim 21, wherein the instructions are further operable, when executed by the processor, to cause the apparatus to transmit the random access signal using the random access resource dedicated to convey the paging time adjustment request.

23. The apparatus of claim 20, wherein the configuration comprises a random access channel preamble dedicated to convey the paging time adjustment request.

24. The apparatus of claim 23, wherein the configuration comprises a unique random access configuration index for the apparatus.

25. The apparatus of claim 17, wherein the instructions are further operable, when executed by the processor, to cause the apparatus to:
determine a type of service associated with the first network subscription;
select the first network subscription for paging time adjustment based on the type of service; and
transmit the random access signal to the first network based on selection of the first network subscription for the paging time adjustment.

26. The apparatus of claim 25, wherein the instructions are further operable, when executed by the processor, to cause the apparatus to:
determine a first priority level associated with the type of service associated with the first network;
determine a second priority level associated with a type of service associated with the second network subscription; and
compare the first priority level and the second priority level,
wherein the selection of the first network subscription for the paging time adjustment is further based on comparison of the first priority level and the second priority level.

27. An apparatus for wireless communication, comprising:
means for determining a first timing of a first set of paging occasions associated with a first network subscription of multiple network subscriptions, wherein the first network subscription is associated with a first network;
means for determining a second timing of a second set of paging occasions associated with a second network subscription of the multiple network subscriptions, wherein the second network subscription is associated with a second network;
means for determining a percentage of paging occasions of the first set that collide in time with paging occasions of the second set;
means for comparing the percentage to a threshold;
means for detecting a paging time adjustment condition in response to the percentage being greater than the threshold; and
based on detection of the paging time adjustment condition, means for transmitting to the first network, the second network or both a random access signal using a random access resource configured to convey a paging time adjustment request.

28. A non-transitory computer readable medium storing code for wireless communication, the code comprising instructions executable by a processor to:
determine a first timing of a first set of paging occasions associated with a first network subscription of multiple network subscriptions, wherein the first network subscription is associated with a first network;
determine a second timing of a second set of paging occasions associated with a second network subscription of the multiple network subscriptions, wherein the second network subscription is associated with a second network;
determine a percentage of paging occasions of the first set that collide in time with paging occasions of the second set;
compare the percentage to a threshold;
detect a paging time adjustment condition in response to the percentage being greater than the threshold; and
based on detection of the paging time adjustment condition, transmit to the first network, the second network or both a random access signal using a random access resource configured to convey a paging time adjustment request.

* * * * *